(12) United States Patent
Krishnamurthy

(10) Patent No.: US 11,374,925 B2
(45) Date of Patent: Jun. 28, 2022

(54) METHOD AND SYSTEM FOR AUTHENTICATING CUSTOMERS ON CALL

(71) Applicant: [24]7.ai, Inc., San Jose, CA (US)

(72) Inventor: Gautham Krishnamurthy, Bangalore (IN)

(73) Assignee: [24]7.ai, Inc., San Jose, CA (US)

( * ) Notice: Subject to any disclaimer, the term of this patent is extended or adjusted under 35 U.S.C. 154(b) by 37 days.

(21) Appl. No.: 16/134,294

(22) Filed: Sep. 18, 2018

(65) Prior Publication Data

US 2019/0089699 A1   Mar. 21, 2019

(30) Foreign Application Priority Data

Sep. 19, 2017   (IN) .............................. 201741033064

(51) Int. Cl.
| | | |
|---|---|---|
| *H04L 9/40* | (2022.01) | |
| *G06F 21/34* | (2013.01) | |
| *H04M 3/523* | (2006.01) | |
| *H04M 3/51* | (2006.01) | |

(52) U.S. Cl.
CPC .......... *H04L 63/0853* (2013.01); *G06F 21/34* (2013.01); *H04M 3/51* (2013.01); *H04M 3/5183* (2013.01); *H04M 3/5233* (2013.01); *H04L 63/0861* (2013.01); *H04M 2203/6054* (2013.01)

(58) Field of Classification Search
CPC . H04L 63/0853; H04L 63/0861; G06F 21/34; H04M 3/51; H04M 3/5233; H04M 3/5183; H04M 2203/6054
See application file for complete search history.

(56) References Cited

U.S. PATENT DOCUMENTS

| | | | |
|---|---|---|---|
| 9,800,727 B1* | 10/2017 | Chakrabarty ....... | H04M 3/5191 |
| 9,894,199 B1 | 2/2018 | Wiechman et al. | |
| 10,034,174 B1* | 7/2018 | Tuomikoski ........ | H04M 3/5166 |
| 10,044,858 B1* | 8/2018 | Harris ................... | H04W 80/12 |
| 10,142,464 B1* | 11/2018 | Cairns ................ | H04M 3/4365 |
| 10,652,739 B1* | 5/2020 | Lilley ..................... | H04W 4/20 |
| 2012/0173434 A1 | 7/2012 | Mardikar et al. | |
| 2015/0094026 A1* | 4/2015 | Martin .............. | H04W 12/0608 455/411 |
| 2015/0358460 A1 | 12/2015 | Monegan et al. | |
| 2016/0239897 A1* | 8/2016 | Ghose ..................... | H04L 67/02 |
| 2017/0026517 A1 | 1/2017 | Nguyen et al. | |
| 2017/0169325 A1* | 6/2017 | McCord ............. | H04M 3/5233 |

(Continued)

FOREIGN PATENT DOCUMENTS

WO        2009022322 A3    10/2009

*Primary Examiner* — Michael Pyzocha
(74) *Attorney, Agent, or Firm* — Perkins Coie LLP; Michael Glenn

(57) ABSTRACT

A method and system for authenticating customers on call are disclosed. The method includes providing a notification to a customer on an electronic device associated with the customer. The notification is provided in response to the customer placing a call for seeking an interaction with an agent of an enterprise. The notification is configured to trigger authentication of the customer using an application on the electronic device. A status of the authentication of the customer is received from the application on the electronic device and, if the status of the authentication of the customer is a success, the call is connected to the agent to facilitate the interaction between the customer and the agent.

16 Claims, 7 Drawing Sheets

(56) References Cited

U.S. PATENT DOCUMENTS

| | | | |
|---|---|---|---|
| 2018/0007203 A1* | 1/2018 | Batlle | H04M 3/4217 |
| 2018/0139206 A1* | 5/2018 | Ezell | H04L 63/083 |
| 2018/0241879 A1* | 8/2018 | Badger | H04M 3/493 |
| 2022/0103687 A1* | 3/2022 | Moller | H04L 67/306 |

* cited by examiner

METHOD AND SYSTEM FOR AUTHENTICATING CUSTOMERS ON CALL

CROSS REFERENCE TO RELATED APPLICATIONS

This application claims priority to Indian Patent Application No. 1/33817/2017/CHE filed Sep. 19, 2017, which is incorporated herein in its entirety by this reference thereto.

TECHNICAL FIELD

The present technology generally relates to mechanisms employed by enterprises for authenticating customers, and more particularly to a method and system for authenticating customers on call.

BACKGROUND

Typically, the customers may contact a customer service center or a customer support center of an enterprise for a variety of purposes. For example, a customer may contact a customer support center to seek assistance on troubleshooting a product, to enquire about a product/service of interest, to make a payment or to lodge a complaint.

Typically, the customers have to undergo multiple layers of qualification prior to connecting for assistance for service or support. For example, when a customer calls a customer support center and is connected to a human agent, the human agent is typically trained to ask several qualification questions to the customer. In case of connecting to an interactive voice response (IVR) system, the IVR system may be configured to ask automated set of questions to the customer. The qualification questions help in authenticating a customer's identity. Since a very small percentage of calling customers are previously authenticated through another mechanism, such as for example through Web interaction or native application-based interaction, most customers may have to go through the qualification process, which consumes additional time on calls leading to a higher cost per call and effort on part of the customer.

Moreover, many times, customers may have to wait for a long period of time to connect to an agent and resolve respective concerns. The qualification questions presented to the customer upon having to wait for a long time to connect can be very frustrating for the customer and can lead to ruining an interaction experience of the customer.

Therefore, there is a need to authenticate calling customers while precluding the need to ask qualification questions to the customers.

SUMMARY

In an embodiment of the invention, a method for authenticating a customer on a call is disclosed. The method provides, by a system, a notification to a customer on an electronic device associated with the customer. The notification is provided in response to the customer placing a call for seeking an interaction with an agent of an enterprise. The notification is configured to trigger authentication of the customer using an application on the electronic device. The method receives, by the system, a status of the authentication of the customer from the application on the electronic device. If the status of the authentication of the customer is a success, the method connects the call to the agent by the system to facilitate the interaction between the customer and the agent.

In an embodiment, a system for authenticating customers on call is disclosed. The system includes a processor and a memory. The memory stores instructions. The processor is configured to execute the instructions and thereby cause the system to provide a notification to a customer on an electronic device associated with the customer. The notification is provided in response to the customer placing a call for seeking an interaction with an agent of an enterprise. The notification is configured to trigger authentication of the customer using an application on the electronic device. The system receives a status of the authentication of the customer from the application on the electronic device. If the status of the authentication of the customer is a success, the system connects the call to the agent to facilitate the interaction between the customer and the agent.

In an embodiment of the invention, an electronic device configured to facilitate authentication of a customer on a call is disclosed. The electronic device includes a biometric access hardware, a memory and a processor. The biometric access hardware is capable of authenticating a customer identity. The memory stores instructions and includes an application associated with an enterprise. The application is configured to facilitate authentication of the customer using the biometric access hardware. The processor is configured to execute the instructions and thereby cause the electronic device to receive a notification from a system. The notification is provided by the system in response to the customer placing a call for seeking an interaction with an agent of the enterprise. Subsequent to a customer selection of the notification, the electronic device causes determination of whether the application is present on the electronic device. The presence of the application on the electronic device is configured to cause an invoking of the application. The electronic device causes determination of whether the application is linked to customer biometric information stored in the electronic device for authenticating the customer subsequent to the invoking of the application. If the application is linked to customer biometric information, the electronic device requests the customer to provide a biometric input using the biometric access hardware. The biometric input is requested in relation to authenticating the customer identity. The electronic device compares the biometric input with the customer biometric information stored in the electronic device. A status of the authentication is determined based on a result of the comparison. The electronic device provides the status of the authentication of the customer to the system. The call is connected to the agent by the system to facilitate interaction between the customer and the agent if the status of the authentication of the customer is a success.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
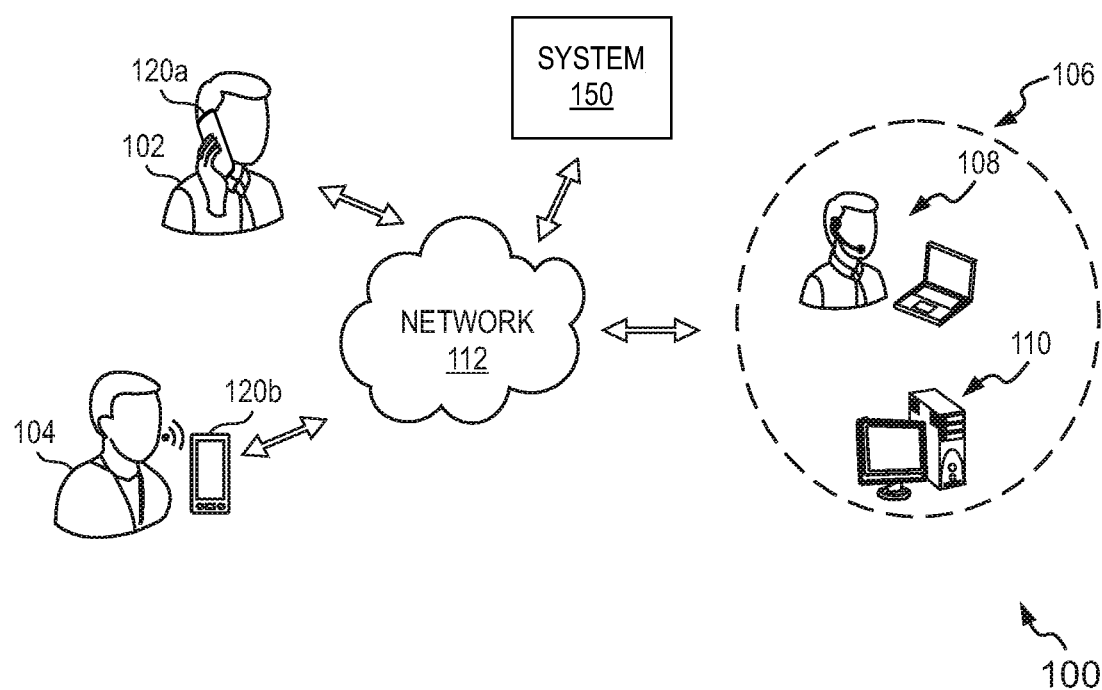
FIG. 1 shows an example representation of an environment in which various embodiments of the present invention may be practiced.

FIG. 1 shows an example representation of an environment 100 in which various embodiments of the present invention may be practiced. The environment 100 is depicted to include customers of an enterprise, such as for example customers 102 and 104. The term 'enterprise' as used herein may refer to a corporation, an institution, a small/medium sized company or even a brick and mortar entity. For example, the enterprise may be a banking enterprise, an educational institution, a financial trading enterprise, an aviation company, a consumer goods enterprise or any such public or private sector enterprise. It is understood that the enterprise may be associated with potential and existing users of products, services and/or information offered by the enterprise. Such existing or potential users of enterprise offerings are referred to herein as customers of the enterprise. The environment 100 is depicted to display only two customers for illustration purposes and it is understood that the enterprise may be associated with a large number of potential and existing customers.

Most enterprises, nowadays, have set up dedicated customer service and support (CSS) centers for providing desired assistance to the customers. A typical CSS center includes a number of customer service representatives, such as agents, chat bots, self-assist systems, such as either Web or mobile digital self-service, and/or interactive voice response (IVR) systems. The customer support representatives are trained to interact with the customers for providing information, selling to them, answering their queries, addressing their concerns, and/or resolving their issues. The environment 100 is depicted to include an example CSS center 106. The CSS center 106 is depicted to include two customer support representatives in form of a human agent 108 and a virtual agent 110 for illustration purposes. It is understood that the CSS center 106 may include several human and virtual agents for assisting customers of an enterprise with their respective queries.

The customers 102 and 104 are depicted to be associated with smart electronic devices, such as an electronic device 120a and an electronic device 120b, respectively. The electronic devices, such as the electronic device 120a and the electronic device 120b, are collectively referred to hereinafter as electronic devices and individually referred to hereinafter as an electronic device. Some non-exhaustive examples of the electronic device may include a smart phone, a tablet device, a wearable device, and the like. The electronic device is configured to facilitate customer communication with customer support representatives of an enterprise over a communication network, such as a network 112. The network 112 may include wired networks, wireless networks, and combinations thereof. Some examples of wired networks may include Ethernet, local area networks (LANs), fiber-optic cable networks, and the like. Some examples of wireless networks may include cellular networks like GSM/3G/4G/5G/CDMA networks, wireless LANs, Bluetooth or ZigBee networks, and the like. An example of a combination of wired and wireless networks may include the Internet.

The environment 100 is further depicted to include a system 150. In at least one embodiment, the system 150 may be embodied as an interaction platform. The various components of the system 150 are explained in detail with reference to FIG. 7. The system 150 is configured to be in operative communication with the CSS center 106 over the network 112. On account of being in operative communication with the CSS center 106, the system 150 is configured to be notified when every customer calls the CSS center 106 to seek assistance from the agents. The term 'call' as used herein may refer to a phone call to an interactive voice response (IVR) system associated with a CSS facility such as the CSS center 106, or a Voice-Over Internet Protocol (VOIP) call or a Web Real-Time Communication (WebRTC) to connect to an agent at the CSS center 106, or any such form of communication enabled by technologies and infrastructure that function on a smart electronic device and that the customer can use to contact the CSS center 106.

In an illustrative example, when a customer dials a customer service number, a tag may be recorded in a Web server (not shown in FIG. 1) associated with the CSS center 106. The recording of the tag may cause an Application Programming Interface (API) Call to the system 150 to enable detection of the customer placing a call to seek interaction with an agent of the enterprise. In at least one example embodiment, the system 150 may be configured to facilitate authentication of the customers on call. In at least one example embodiment, the system 150 is configured to leverage biometric capability of a customer's electronic device to enable customer authentication on the call, as will be explained in further detail hereinafter.

Nowadays, most electronic devices such as smartphones, tablets, laptops, wearable devices, and the like, are equipped with biometric access hardware capable of recording customer biometric attributes, such as thumb (or finger) impressions, facial features, iris, and the like, and store such scanned/recorded biometric attributes as biometric information locally on the electronic device. Typically, when a customer is required to access biometric enabled electronic device or an enterprise application installed on the electronic device that requires authentication, the customer is initially prompted to scan and register one or more biometric attributes. A biometric attribute may be recorded in form of the customer's fingerprint scan and/or face or iris scan. The scanned attribute is stored in the electronic device as biometric information and the customers have an option to leverage the same data to authenticate access to several other applications.

In many example scenarios, the electronic device manufacturer exposes biometric authentication frameworks, such as Touch ID for iOS® and FPID for Android®, as Application Programming Interfaces (APIs) that can be used by application developers to enable biometric authentication for their respective applications. When a customer downloads/installs/accesses the enterprise application for the first time, the customer is given an option to enable biometric authentication in the enterprise application. Customers are required to input Sign-in credentials (for example, customer name, password, account ID, pin number, and the like) and are prompted to scan their biometric attribute. Once the registration process is complete, customers can leverage their biometric information to access the enterprise application. The term 'enterprise application' as used hereinafter may refer to a native mobile application or a mobile Web application associated with the enterprise. The enterprise application is also interchangeably referred to as an application hereinafter.

In some example scenarios, customers of an enterprise may have downloaded an instance of an application associated with the enterprise from an application store and may have already linked biometric information with the application. Thereafter, when the customer places a call to the CSS center 106 to seek an interaction with an agent of the enterprise, the system 150 on account of being communicably linked with the CSS center 106, receives an intimation of the event corresponding to the customer placing the call. In response to the receipt of the customer call, the system 150 provides a notification to the customer on the electronic device associated with the customer (such as for example, on the electronic device 120a associated with the customer 102). The notification may be embodied as a Short Message Service (SMS) notification including a hyperlink, or a notification embodied as a Web browser notification or an Operating System (OS) notification to be displayed on the customer's electronic device. A customer selection (such as for example, by providing a touch input or a click input) on the hyperlink in the SMS notification or on the browser/OS notification may cause invoking of the enterprise application (for example, the native mobile application associated with the enterprise) installed in the customer's electronic device. The invoked application may be configured to request the customer to provide a biometric input. When the customer provides the biometric input, the biometric input is captured by a sensor and the scan is temporarily stored in encrypted memory. A secure authentication framework compares the biometric input with the customer biometric information stored in the customer's electronic device and a result of the comparison configures the status of the authentication. For example, if the biometric input matches the customer biometric information, i.e. the result of the comparison is a 'match', then the status of the authentication of the customer is a success. However, if the biometric input does not match the stored customer biometric information, i.e. the result of the comparison is 'no match', then the status of the authentication of the customer is 'fail'. More specifically, the status of the authentication is a success or failure of the match. The status of the authentication is provided by the application to the system 150. The status of the authentication may be provided in form of an encrypted codeword or may be embodied as a predefined binary sequence implying one of a successful or failed authentication of the customer. If the status of the authentication received by the system 150 is a success, then the system 150 may be configured to connect the call to the appropriate human/virtual agent at the CSS center 106 to facilitate customer communication with an agent of the enterprise.

In some scenarios, a customer may have not installed the enterprise application locally in a respective electronic device. In such a scenario, when the customer contacts the CSS center 106, the system 150 may be configured to provision a SMS notification including a hyperlink or cause a notification such as a Web browser notification or an OS notification to be displayed on the customer's electronic device. A customer selection of the hyperlink in the SMS notification or a selection of the browser/OS notification may cause invoking of the application. When the trigger through notification cannot locate a specific application (i.e. the application associated with the enterprise) on the customer's electronic device, the customer may be prompted to download the application associated with the enterprise. In at least one embodiment, the notification provided by the system may be associated with an executable script capable of performing a check for a presence of the application in the electronic device, and thereafter generating a message for requesting the user to download the application if the application is not installed in the electronic device. The downloading of the application may involve providing the customer with the option to enable biometric authentication in the application and thereafter facilitating the biometric attribute registration process, as explained above.

In some scenarios, the customer may have installed the application locally in his/her electronic device but may have not linked the stored customer biometric information with the application, or in some cases, the application of the enterprise may not be configured to receive biometric information from the customer. In such a scenario, the executable script associated with the notification may be configured to first check if the application is linked to the stored biometric information and, if not, cause the customer's electronic device to display a message requesting the customer to register the biometric information when the customer contacts the CSS center 106 for the first time (or when the customer makes a transaction with the enterprise for the first time). The registration of the biometric attribute may be performed as explained above and is not explained again herein.

As explained above, subsequent to the customer's registration of the biometric attribute, if a call placed by a customer is detected by the system 150, then the enterprise application in the customer's electronic device may be invoked and the customer may be requested to provide a biometric input so as to authenticate a customer identity. In at least one example embodiment, the system 150 may be configured to provision a Short Message Service (SMS) notification or a push notification in form of an operating system (OS) notification, browser notification or even an email notification, to the customer to facilitate invoking of the application in the customer's electronic device. The application is configured to use local authentication frameworks (such as Touch ID for iOS® and FPID for Android®), which provide a facility for requesting authentication from customers through pass phrases or biometrics. Such a scenario is explained with reference to FIGS. 2A and 2B.

Figure 2A:
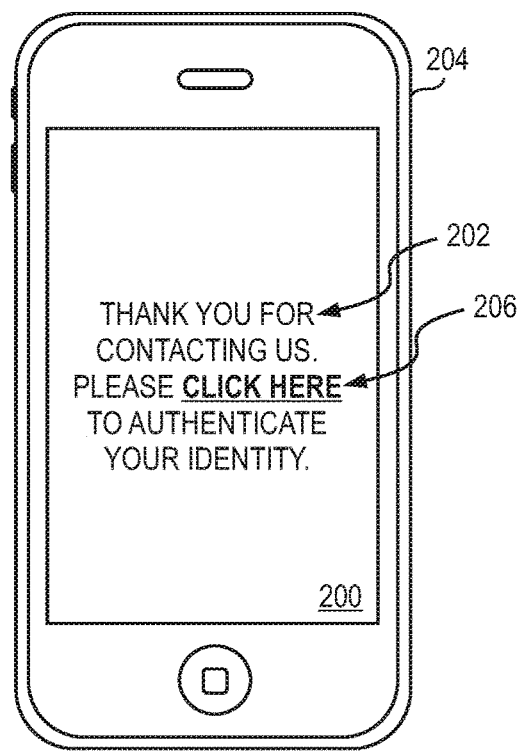
FIG. 2A depicts an example representation of a UI associated with a SMS notification displayed to a customer, in accordance with an embodiment of the invention.

Referring now to FIG. 2A, an example representation of a UI 200 associated with a SMS notification 202 displayed to a customer is depicted, in accordance with an embodiment of the invention. The UI 200 is displayed on a display screen of a customer's electronic device 204 subsequent to the customer placing a call to a customer service/support center associated with an enterprise, such as the CSS center 106 shown in FIG. 1.

The SMS notification 202 is exemplarily depicted to include the text 'THANK YOU FOR CONTACTING US. PLEASE CLICK HERE TO AUTHENTICATE YOUR IDENTITY'. As explained with reference to FIG. 1, the system 150 is notified of an event corresponding to a customer placing a call to a customer service/support center of an enterprise for seeking an interaction with an agent of the enterprise. The system 150 may be configured to provision a SMS notification or a push notification to the customer on the customer's electronic device used for placing the call to the customer service/support center. An example SMS notification provided by the system 150 to the customer on the customer's electronic device 204 is shown in the form of the SMS notification 202. The SMS notification 202 includes a hyperlink 206, exemplarily depicted to be associated with text 'CLICK HERE', capable of receiving customer selection. A touch or click selection input on the hyperlink 206 provided in the SMS notification 202 is configured to trigger an authentication of the customer.

It is noted that a notification provided to the customer is depicted as a SMS notification for illustration purposes and that the notification may be embodied as a push notification, such as a Web browser notification or a OS notification. Further, the customer's electronic device 204 is depicted as a smartphone for illustration purposes. In some embodiments, the customer's electronic device 204 may be embodied as any electronic device equipped with biometric access hardware such as for example, a tablet computer, a laptop or a wearable device.

In an example embodiment, the touch or click selection input on the hyperlink 206 provided in the SMS notification 202 may cause display of another UI to trigger the authentication of the customer. Such an example UI is explained with reference to FIG. 2B.

Figure 2B:
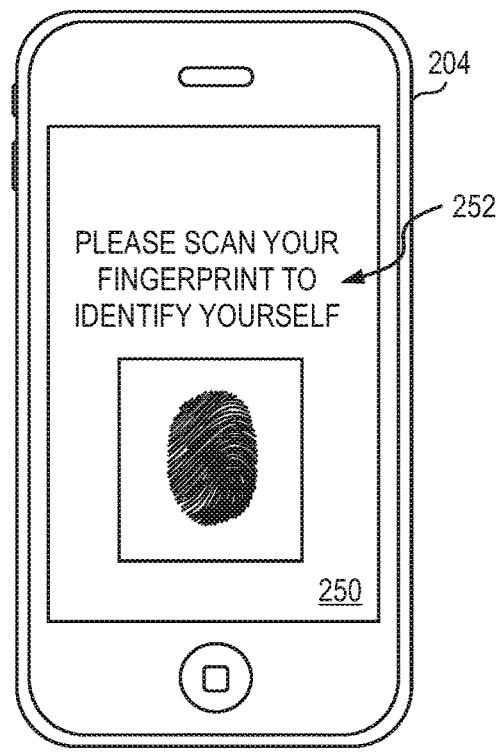
FIG. 2B depicts an example representation of a UI associated with a message displayed to a customer, in accordance with an embodiment of the invention.

Referring now to FIG. 2B, an example representation of a UI 250 associated with a message 252 displayed to a customer is depicted, in accordance with an embodiment of the invention. The UI 250 is displayed on a display screen of the customer's electronic device 204 subsequent to the customer selection of the hyperlink 206 in the SMS notification 202, shown in FIG. 2A.

The message 252 is exemplarily depicted to include the text 'PLEASE SCAN YOUR FINGERPRINT TO IDENTIFY YOURSELF'. As explained with reference to FIG. 1, a touch or a click selection input on a hyperlink provided in the SMS or on the push notification, such as Web browser notification or an OS notification, is configured to cause invoking of an enterprise application (for example, a native mobile application associated with the enterprise) in the electronic device, which in turn is configured to request a biometric input from the customer. The request for biometric input may be embodied in form of a message, such as the 252, displayed on the display screen of the customer's electronic device 204.

Figure 3:
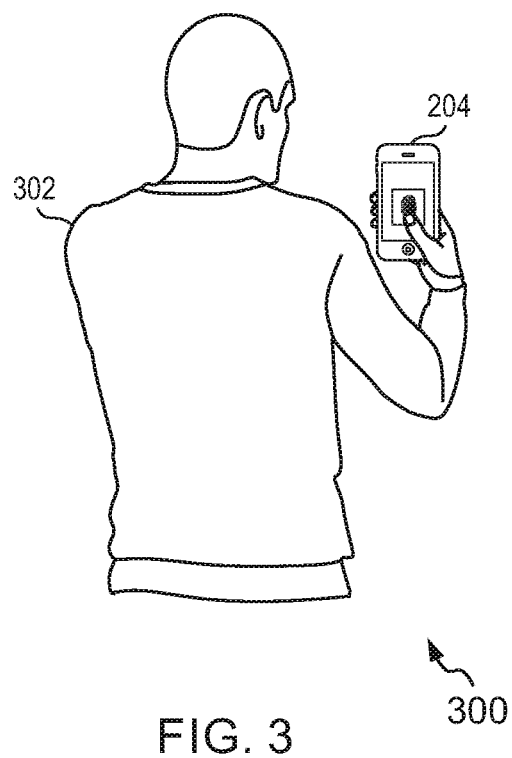
FIG. 3 depicts an example representation of a customer providing a thumb impression on a power key of the customer's electronic device to provision the fingerprint scan input, in accordance with an embodiment of the invention.

Subsequent to receiving such a message, the customer may be configured to provide a fingerprint scan input as depicted in FIG. 3. More specifically, FIG. 3 depicts an example representation 300 of a customer 302 providing a thumb impression on a power key of the customer's electronic device 204 to provide the fingerprint scan input, in accordance with an embodiment of the invention. It is noted that the providing of the biometric attribute in form of finger/thumb scan input is mentioned herein for illustration purposes. Indeed, other forms of biometric input, such as iris scan input and the like, which are capable of uniquely identifying the customer may also be provisioned for authenticating a personal identity of the user. As explained with reference to FIG. 1, when the customer provides the biometric input, the biometric input is captured by a sensor and the scan is temporarily stored in encrypted memory by the application. The registered customer biometric information stored in the customer's electronic device 204 is sent to the temporary storage. A secure authentication framework invoked by the application compares the biometric input with the stored customer biometric information and the result of the comparison configures the status of the authentication. The application facilitating such customer authentication is configured to provide the status of the authentication to the system 150. If the customer's identity is authenticated, i.e. the status of the authentication of the customer is a success, then the system 150 is configured to facilitate customer communication with an appropriate human/virtual agent at the CSS 106. In at least one embodiment, the customer call to the customer service/support center is not disconnected throughout the authentication process and as such the customer authentication is performed on call, while precluding the need to ask qualification questions to the customer.

Figure 4:
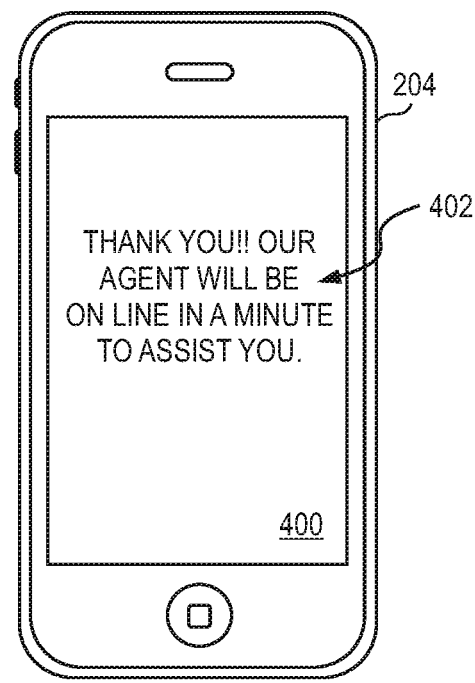
FIG. 4 depicts an example representation of a UI showing another message displayed to a customer, in accordance with an embodiment of the invention.

Referring now to FIG. 4, an example representation of a UI 400 showing a message 402 displayed to a customer is depicted, in accordance with an embodiment of the invention. The UI 400 is displayed on a display screen of the customer's electronic device 204 subsequent to successful authentication of the biometric information provided by the customer. The message 402 is exemplarily depicted to include the text 'THANK YOU! OUR AGENT WILL BE ON LINE IN A MINUTE TO ASSIST YOU'. The agent, such as a human agent or a virtual agent, may then be connected with the customer on the call to assist the customer with his or her requirement.

In at least some embodiments, the customer authentication may assist the system 150 in predicting customer's intent for seeking interaction with the agent of the enterprise. In an illustrative example, a customer's identity may be identified from a device identifier used by the customer for contacting a CSS center, such as the CSS center 106 shown in FIG. 1. For example, the device identifier may be extracted from information exchanged between the customer's electronic device and the Web server at the CSS center during setting up of a session as part of establishing two-way communication between the customer and the agent. In at least some embodiments, the device identifier may facilitate identification of the customer, which in turn may facilitate fetching of historical data corresponding to previous customer interactions with the enterprise. It is noted that the system 150 may be in operative communication with web servers logging customer activity on enterprise interaction channels, such as enterprise websites, and with other customer touch points, such as devices of agents, virtual assistants (VA) installed in customer's electronic devices, and the like. For example, if the customer's recent activity on the enterprise website is indicative of the customer's desire to purchase a new laptop, then the system 150 may be configured to predict that the customer may have called to inquire about the laptop or purchase the laptop. In another illustrative example, if the customer has recently purchased a flight ticket, then the system 150 may predict that the customer may have called to inquire about the trip or reschedule/cancel the trip. It is noted that the system 150 may include prediction algorithms, such as models based on Logistic Regression, Support Vector Machines, Decision Trees, etc., configured to process customer interaction data collated from several enterprise interaction channels to predict the customer's intention for seeking interaction with the agent of the enterprise. In at least one example embodiment, based on such prediction, the system 150 may be configured to route the call to an appropriate agent, i.e. the call may be routed to an agent equipped to handle specific queries related to the predicted intention, or to an agent matching the customer's persona type, and the like. In some embodiments, the system 150 may also be configured to provision recommendations to the agent to enable the agent to handle the customer's concern in an effective manner. For example, if the customer is predicted to have called for purchasing a laptop, then recommendations related to preferred laptop brands, color preferences and price preferences may be provided to the agent as recommendations for assisting the agent in providing an enriched interaction experience to the customer.

It is noted that the authentication of the customer on the call, as described above, precludes the need for the agents to subject the customer to multiple layers of qualification, thereby saving time and improving a quality of interaction experience for the customer.

Figure 5:
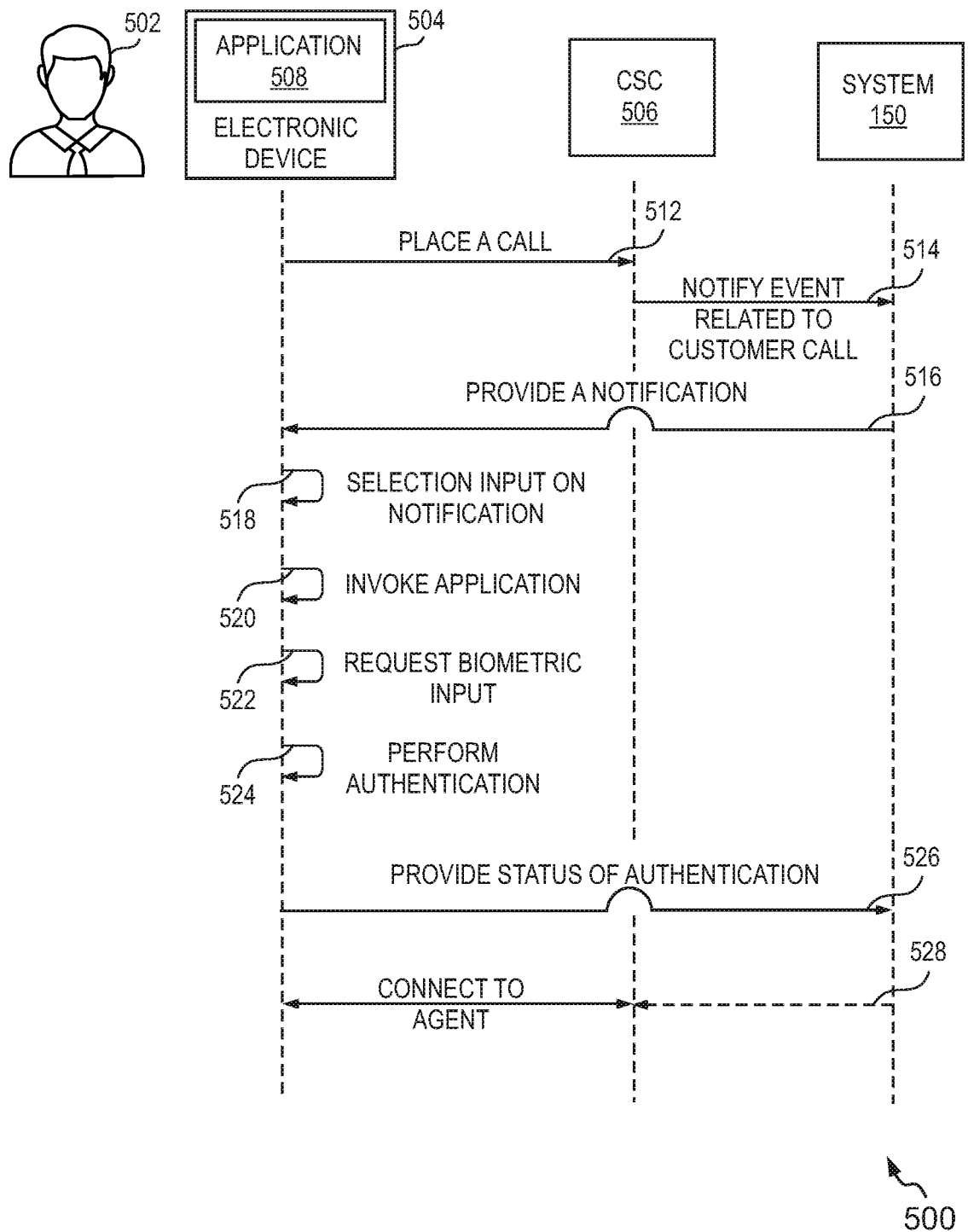
FIG. 5 shows a sequence flow diagram for illustrating a process flow associated with authenticating a customer on a call, in accordance with an embodiment of the invention.

FIG. 5 shows a sequence flow diagram for illustrating a process flow 500 associated with authenticating a customer on a call, in accordance with an embodiment of the invention. The process flow 500 starts at 512.

At 512 of the process flow 500, a customer 502 places a call to a customer support center (CSC) 506 using an electronic device 504. In an illustrative example, the electronic device 504 corresponds to a smartphone equipped with biometric access hardware. The call may correspond a call to the IVR system associated with the enterprise, or one of a VOIP call or a WebRTC call to the CSC 506 for seeking an interaction with an agent of the enterprise.

At 514 of the process flow 500, the system 150 (explained with reference to FIGS. 1 to 4) is notified of the event of the customer placing a call to the CSC 506.

At 516 of the process flow 500, in response to the event of the customer placing the call, the system 150 provides a notification to the customer 502 on the electronic device 504.

At 518 of the process flow 500, the customer 502 provides a selection input on the notification. For example, the customer 502 may provide a selection input on a hyperlink included in the notification embodied as a SMS notification, such as the hyperlink 206 included in the SMS notification 202. It is noted that in some embodiments, the notification may be embodied as a Web browser notification or an OS notification and the customer 502 may provide a touch or a click input for selecting the notification.

At 520 of the process flow 500, the selection of the notification is configured to invoke an application 508 (for example, a native mobile application associated with an enterprise) included in the electronic device 504. In some embodiments, where the application 508 is not present (i.e. not installed) within the customer's electronic device 504, the notification may be configured to trigger a request to the customer 502 to install the application 508 on the electronic device 504. The request may be embodied in a form similar to the SMS notification 202 or the message 252 shown in FIG. 2A or 2B, respectively. The customer 502 may further be requested to link the application 508 to the customer biometric information stored in the electronic device 504 using a local authentication framework available in the electronic device 504.

At 522 of the process flow 500, the invoked application 508 is configured to request the customer 502 to provide a biometric input to authenticate a customer identity.

At 524 of the process flow 500, the application 508 is configured to perform customer authentication by comparing the biometric input with the customer biometric information.

At 526 of the process flow 500, the application 508 in the electronic device 504 is configured to provide the status of the authentication (i.e. the result of the comparison) to the system 150.

At 528, the process flow 500, the system 150 is configured to connect the customer call to an agent in the CSC 506 if the status of the authentication is a success to facilitate the customer interaction with the agent. The process flow 500 ends at 528.

Figure 6:
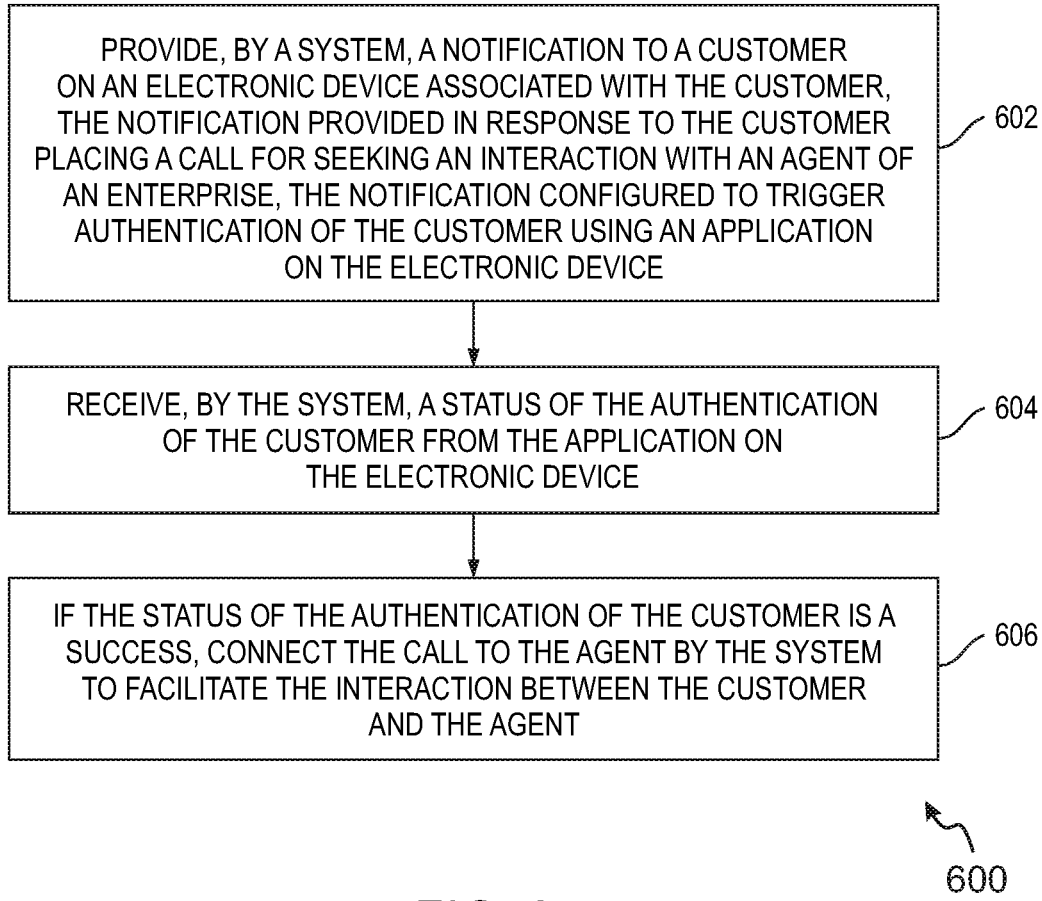
FIG. 6 is a flow diagram of an example method for authenticating a customer on a call, in accordance with an embodiment of the invention.

FIG. 6 is a flow diagram of an example method 600 for authenticating a customer on a call, in accordance with an embodiment of the invention. The method 600 depicted in the flow diagram may be executed by, for example, the system 150 explained with reference to FIGS. 1 to 5. Operations of the flowchart, and combinations of operation in the flowchart, may be implemented by, for example, hardware, firmware, a processor, circuitry and/or a different device associated with the execution of software that includes one or more computer program instructions. The operations of the method 600 are described herein with help of the system 150. It is noted that, the operations of the method 600 can be described and/or practiced by using a system other than the system 150. The method 600 starts at operation 602.

At operation 602 of the method 600, a notification is provided to a customer on an electronic device associated with the customer by a system, such as the system 150 explained with reference to FIGS. 1 to 5. The notification is provided to the customer in response to the customer placing a call for seeking an interaction with an agent of an enterprise. As explained with reference to FIG. 1, the customer may seek interaction with an agent for various reasons, such as for troubleshooting a product, for resolving a billing issue, for making a payment, and the like. Accordingly, the customer may place a call, such as a phone call to an IVR associated with the enterprise, a VOIP call or a WebRTC communication, to initiate a voice interaction with the agent. The system may be notified of the event of the customer placing a call to seek an interaction with the agent of the enterprise and in response to such an event, the system may provide a notification to the customer on the customer's electronic device. Some non-limiting examples of the notification may include a SMS notification, a Web browser notification, an OS notification, and the like.

The notification is configured to trigger authentication of the customer using an application on the electronic device. For example, a selection input on the notification may trigger (for example, using an API call) an invoking of an application. The application may correspond to a native mobile application or a mobile Web application associated with the enterprise. In some embodiments, the notification is associated with an executable script capable of being run subsequent to receiving the customer selection input. In one embodiment, the executable script may be configured to perform a determination of whether the application is present in the electronic device. If the application is determined to be present, then the application is invoked. However, if the application is not present in the electronic device, then the script may be configured to trigger a request to the customer to download the application on the electronic device. Further, the executable script may be configured to perform a determination of whether the application is linked to customer authentication information, such as customer biometric information, stored in the electronic device. If the application is not linked to the customer authentication information, then the executable script may be configured to trigger a request to the customer to link the application to customer biometric information using a local authentication framework available in the electronic device.

In at least one example embodiment, the invoked application is configured to request a biometric input from the customer. The provisioning of the request to provide the biometric input and subsequent comparison of the biometric input with the stored customer biometric information may be performed as explained with reference to FIGS. 3 to 4. The result of the comparison may configure the status of the authentication. For example, if the biometric input matches the customer biometric information, i.e. the result of the comparison is a 'match', then the status of the authentication of the customer is a success. However, if the biometric input does not match the stored customer biometric information, i.e. the result of the comparison is 'no match', then the status of the authentication of the customer is 'fail'. The application may further be configured to provide the status of the authentication to the system. The status of the authentication may be provided in form of an encrypted codeword or may be embodied as a predefined binary sequence implying one of a successful or failed authentication of the customer.

At operation 604 of the method 600, a status of the authentication of the customer is received by the system from the application on the electronic device.

At operation 606 of the method 600, if the status of the authentication of the customer is a success, the customer call is connected to the agent to facilitate the interaction between the customer and the agent by the system. In at least one embodiment, the customer call to the customer service/support center is not disconnected throughout the authentication process and as such the customer authentication is performed on call, while precluding the need to ask qualification questions to the customer. The authentication of the customer on the call, as described above, precludes the need for the agents to subject the customer to multiple layers of qualification, thereby saving time and improving a quality of interaction experience for the customer.

In at least some embodiments, the customer authentication may assist in predicting customer's intention for seeking interaction with the agent of the enterprise. In at least one example embodiment, based on such prediction, the system may be configured to route the call to an appropriate agent (i.e. the call may be routed to an agent equipped to handle specific queries related to the predicted intention, or to an agent matching the customer's persona type, and the like). In some embodiments, the system may also be configured to provide recommendations to the agent to enable the agent to handle the customer's concern in an effective manner. The prediction of customer's intention and the subsequent providing of recommendations may be performed as explained with reference to FIG. 4 and is not explained herein.

Figure 7:
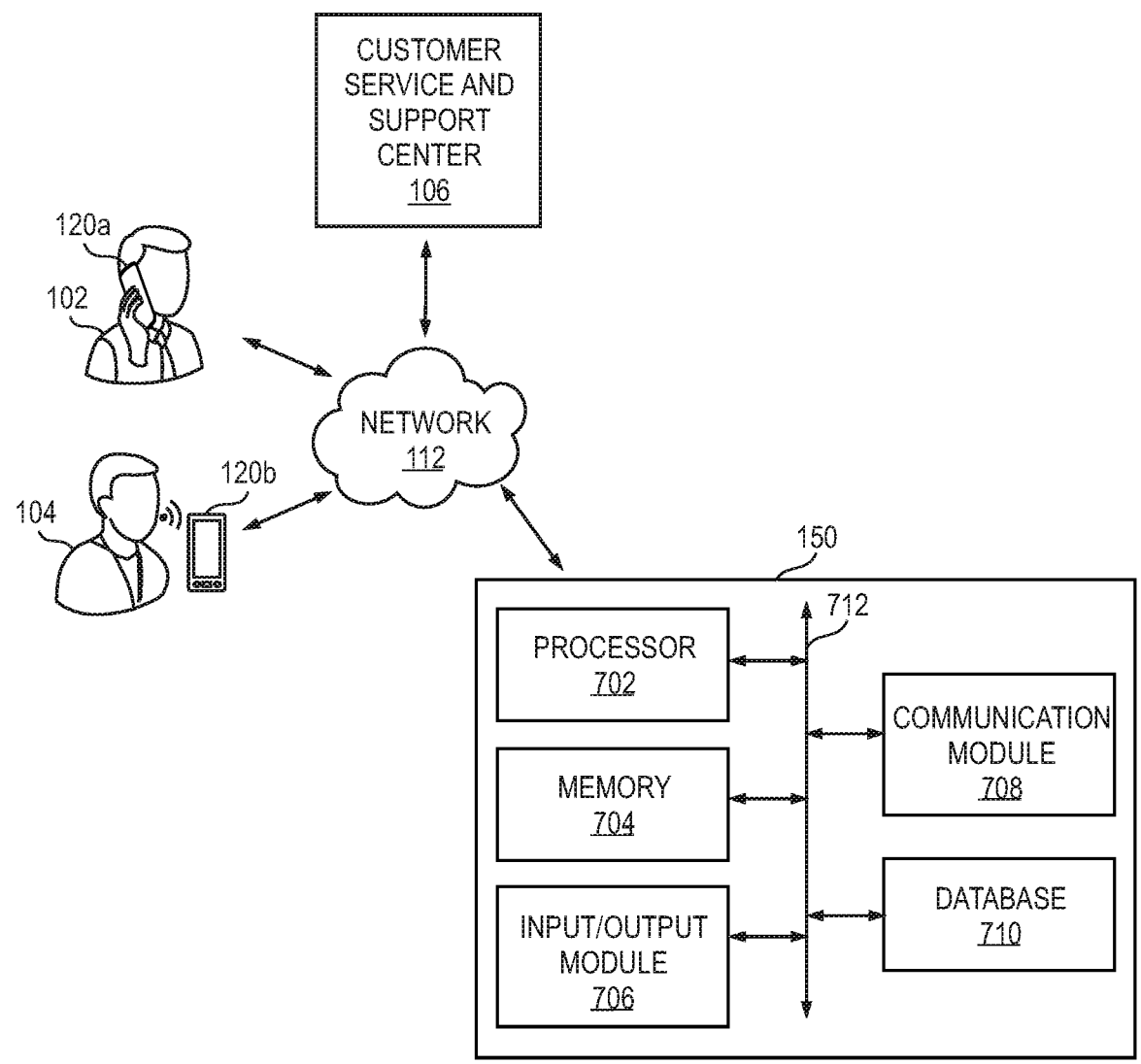
FIG. 7 illustrates a block diagram representation of a system of FIG. 1, in accordance with an embodiment of the invention.

FIG. 7 illustrates a block diagram representation of the system 150 of FIG. 1, in accordance with an embodiment of the invention. In at least one embodiment, the system 150 is embodied as an interaction platform and is configured to perform one or more functions as explained with reference to FIGS. 1 to 5 to facilitate authentication of customers on call.

The system 150 is depicted to include a processor 702, a memory 704, an input/output (I/O) module 706, a communication module 708 and a database 710.

In an embodiment, the processor 702 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The memory 704 may be embodied as one or more volatile memory devices, one or more non-volatile memory devices, and/or a combination of one or more volatile memory devices and non-volatile memory devices, for storing customer information and instructions. For example, the memory 704 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.).

The memory 704 includes stored instructions, which are executed by the processor 702 for facilitating authentication of customers on the call. For example, the processor 702 is configured to perform the various operations as explained with reference to method 600 using the instructions stored in the memory 704. For example, the processor 702 provides a notification to the customer on the customer's electronic device in response to the customer placing a call for seeking interaction with an agent of the enterprise. The notification provided by the processor 702 is configured to trigger authentication of the customer using customer authentication hardware available in the electronic device. The processor 702 receives the status of authentication from an enterprise application in the electronic device and connects the customer call to an agent if the status of the authentication is a success, for facilitating interaction between the customer and the agent.

In addition to storing instructions for generating the notification, and logic for connecting the customer call to the agent, the memory 704 also stores intention prediction algorithms and logic for matching customer persona (i.e. behavioral attributes) to agent attributes to route the customer call to the appropriate agent. The memory 704 also stores instructions for generating recommendations to assist the agents in handling customer queries in an effective manner.

In an embodiment, the I/O module 706 may include mechanisms configured to receive inputs from and provide outputs to the user of the system 150. The term 'user of the system 150' as used herein refers to any individual or groups of individuals assigned with operating the system 150 and configuring the system 150 for facilitating authentication of customers on call. In an illustrative example, an enterprise may employ several data scientists, Machine Learning (ML) and/or Artificial Intelligence (AI) analysts, Information Technology (IT) professionals, scientists and researchers for configuring and operating the system 150 embodied as an interaction platform. In an illustrative example, the I/O module 706 may enable the user of the system 150 to define various workflow stages to facilitate authentication of customers on call. To that effect, the I/O module 706 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, etc.), a microphone, a speaker, a ringer, a vibrator, and the like.

The communication module 708 is configured to facilitate communication between the system 150 and remote entities such as the CSS center 106 and customer electronic devices, such as the electronic devices 120a and 120b associated with the customers 102 and 104, respectively. To that effect, the communication module 708 includes communication circuitry such as for example, a transceiver circuitry including antenna and other communication media interfaces to connect to a wired and/or wireless communication network. The communication circuitry enables transmission of data signals and/or reception of signals from remote network entities, such as a Web server hosting the enterprise website, customer electronic devices and/or agent electronic devices. It is noted that the communication may be achieved over a communication network, such as network 112, to facilitate authentication of customers on call as explained with reference to FIGS. 1 to 5.

The database 710 is a datastore configured to store historical interaction data (such as conversational data) associated with customer interactions with the agents of the enterprise. The storage of the conversational data may facilitate prediction of the customer's intention.

In an embodiment, various components of the system 150, such as the processor 702, the memory 704, the I/O module 706, the communication module 708 and the database 710 are configured to communicate with each other via or through a centralized circuit system 712. The centralized circuit system 712 may be various devices configured to, among other things, provide or enable communication between the components (702-710) of the system 150. In certain embodiments, the centralized circuit system 712 may be a central printed circuit board (PCB) such as a motherboard, a main board, a system board, or a logic board. The centralized circuit system 712 may also, or alternatively, include other printed circuit assemblies (PCAs) or communication channel media. In at least one embodiment, the centralized circuit system 712 may include a storage interface (not shown in FIG. 7) to facilitate communication between the processor 702 and the database 710. Some examples of the storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 702 with access to content stored in the database 710.

Figure 8:
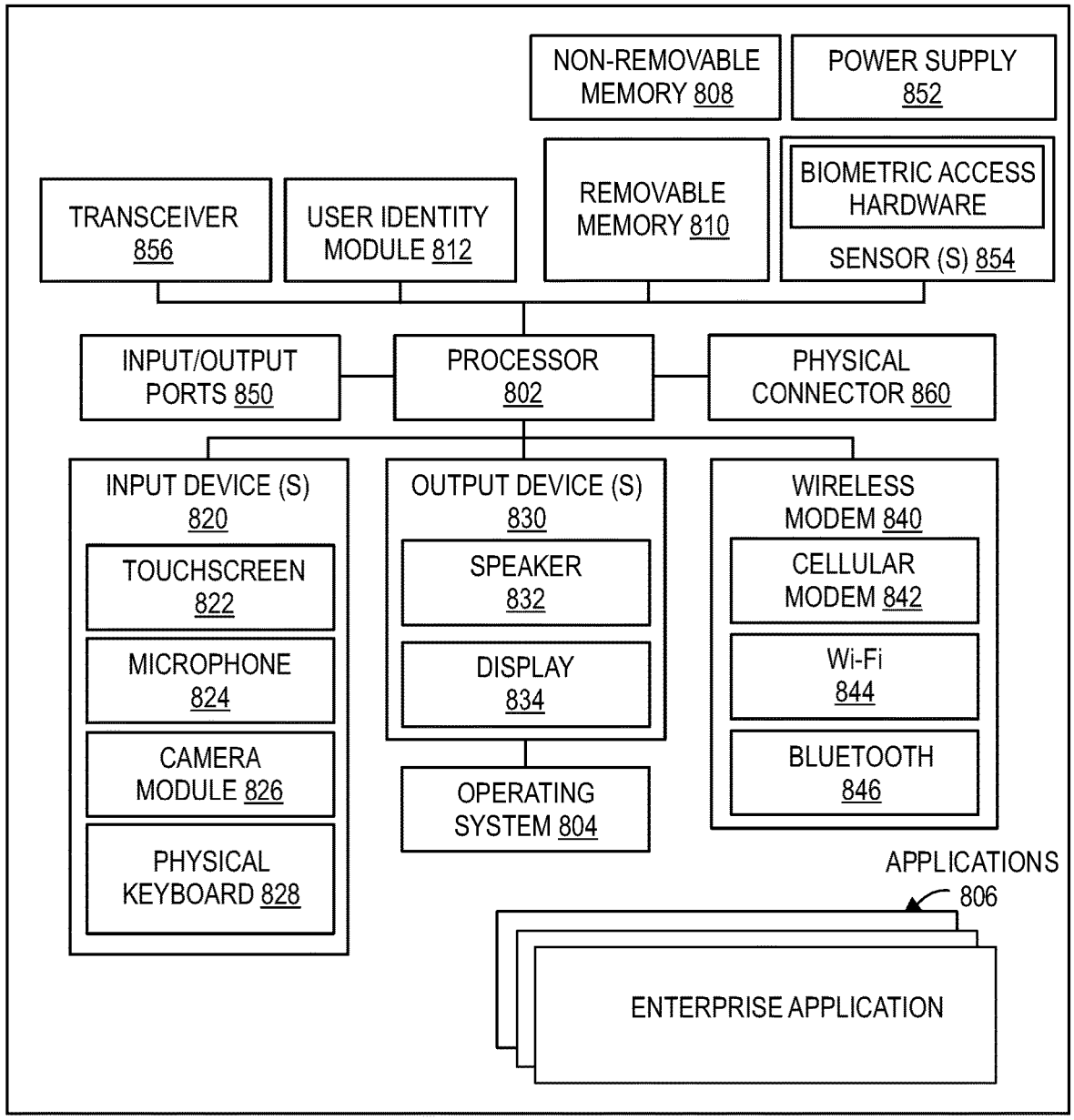
FIG. 8 illustrates an electronic device in accordance with an embodiment of the invention.

FIG. 8 illustrates an electronic device 800 in accordance with an embodiment of the invention. In an embodiment, the electronic device 800 may correspond to a smart electronic device associated with the customer. The electronic device 800 is depicted to include one or more applications 806, including a native mobile application associated with the enterprise, shown in FIG. 8 as 'enterprise application'. In some embodiments, the enterprise application may be configured to be invoked subsequent to a customer selection of a notification, and facilitate customer authentication using local authentication framework, as explained with reference to FIGS. 1 to 5.

It should be understood that the electronic device 800 as illustrated and hereinafter described is merely illustrative of one type of device and should not be taken to limit the scope of the embodiments. As such, it should be appreciated that at least some of the components described below in connection with that the electronic device 800 may be optional and thus in an example embodiment may include more, less or different components than those described in connection with the example embodiment of the FIG. 8. As such, among other examples, that the electronic device 800 could be any of mobile electronic devices, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 800 includes a controller or a processor 802 (e.g., a signal processor, microprocessor, ASIC, or other control and processing logic circuitry) for performing such tasks as signal coding, data processing, image processing, input/output processing, power control, and/or other functions. An operating system 804 controls the allocation and usage of the components of the electronic device 800 and support for one or more applications programs (see, applications 806), such as the enterprise application that implements one or more of the innovative features described herein. In addition to the enterprise application, the applications 806 may include common mobile computing applications (e.g., telephony applications, email applications, calendars, contact managers, web browsers, messaging applications) or any other computing application. The operating system 804 may also store a secure local authentication framework capable of facilitating user authentication using authentication means, such as biometric access hardware (shown as sensors 856) in FIG. 8.

The illustrated electronic device 800 includes one or more memory components, for example, a non-removable memory 808 and/or removable memory 810. In a least one embodiment, the non-removable memory 808 and/or the removable memory 810 stores user biometric information subsequent to user registration of biometric attributes. The stored user biometric information enables user authentication for accessing the electronic device 800 as well as for accessing various applications within the electronic device 800. The non-removable memory 808 may include RAM, ROM, flash memory, a hard disk, or other well-known memory storage technologies. The removable memory 810 can include flash memory, smart cards, or a Subscriber Identity Module (SIM). The one or more memory components can be used for storing data and/or code for running the operating system 804 and the applications 806. The electronic device 800 may further include a user identity module (UIM) 812. The UIM 812 may be a memory device having a processor built in. The UIM 812 may include, for example, a subscriber identity module (SIM), a universal integrated circuit card (UICC), a universal subscriber identity module (USIM), a removable user identity module (R-UIM), or any other smart card. The UIM 812 typically stores information elements related to a mobile subscriber. The UIM 812 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 800 can support one or more input devices 820 and one or more output devices 830. Examples of the input devices 820 may include, but are not limited to, a touch screen 822 (e.g., capable of capturing finger tap inputs, finger gesture inputs, multi-finger tap inputs, multi-finger gesture inputs, or keystroke inputs from a virtual keyboard or keypad), a microphone 824 (e.g., capable of capturing voice input), a camera module 826 (e.g., capable of capturing still picture images and/or video images), and a physical keyboard 828. Examples of the output devices 830 may include but are not limited to a speaker 832 and a display 834. Other possible output devices (not shown in the FIG. 8) can include piezoelectric or other haptic output devices. Some devices can serve more than one input/output function. For example, the touchscreen 822 and the display 834 can be combined into a single input/output device.

A wireless modem 840 can be coupled to one or more antennas (not shown in the FIG. 8) and can support two-way communications between the processor 802 and external devices, as is well understood in the art. The wireless modem 840 is shown generically and can include, for example, a cellular modem 842 for communicating at long range with the mobile communication network, a Wi-Fi compatible modem 844 for communicating at short range with an external Bluetooth-equipped device or a local wireless data network or router, and/or a Bluetooth-compatible modem 846. The wireless modem 840 is typically configured for communication with one or more cellular networks, such as a GSM network for data and voice communications within a single cellular network, between cellular networks, or between the electronic device 800 and a public switched telephone network (PSTN).

The electronic device 800 can further include one or more input/output ports 850, a power supply 852, one or more sensors 854 including biometric access hardware among other sensors for example, an accelerometer, a gyroscope, a compass, or an infrared proximity sensor for detecting the orientation or motion of the electronic device 800, a transceiver 856 (for wirelessly transmitting analog or digital signals) and/or a physical connector 860, which can be a USB port, IEEE 1294 (FireWire) port, and/or RS-232 port. The illustrated components are not required or all-inclusive, as any of the components shown can be deleted and other components can be added.

In at least one example embodiment, the processor 802 is configured to receive a notification provided by a system, such as the system 150 (explained with reference to FIGS. 1 to 5) in response to an event related to a customer placing a call seeking an interaction with an agent of the enterprise. Subsequent to customer selection of the notification, the processor 802 is configured cause determination of a presence of the enterprise application on the electronic device 800 and cause an invoking of the enterprise application if the enterprise application is installed on the electronic device 800. The processor 802 is further configured to cause determination of whether the enterprise application is linked to customer biometric information stored in the electronic device 800 for authenticating the customer subsequent to the invoking of the application. The enterprise application is configured to request the user of the electronic device 800 to provide a biometric input using the biometric access hardware to authenticate a user identity. The processor 802 is further configured to compare the biometric input with the user biometric information stored in the electronic device by using an authentication framework available in the electronic device 800 to generate the status of the authentication. The processor 802 is further configured to provide the status of the authentication (i.e. result of the comparison) of the customer to the system. As explained with reference to FIGS. 1 to 5, an interaction between the customer and the agent is facilitated by the system if the status of the authentication of the customer is a success.

Without in any way limiting the scope, interpretation, or application of the claims appearing below, advantages of one or more of the exemplary embodiments disclosed herein provide numerous advantages. The techniques disclosed herein provide a method and system for authenticating customers on call. The calling customers are authenticated by leveraging the biometric identification capability available in smart devices of the customers. As a result, the customers are authenticated without being subjected to multiple layers of qualification, thereby saving time and cost per call, and improving a quality of interaction experience for the customers.

Various embodiments described above may be implemented in software, hardware, application logic or a combination of software, hardware and application logic. The software, application logic and/or hardware may reside on one or more memory locations, one or more processors, an electronic device or, a computer program product. In an embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, as described and depicted in FIG. 7. A computer-readable medium may include a computer-readable storage medium that may be any media or means that can contain or store the instructions for use by or in connection with an instruction execution system, system, or device, such as a computer.

Although the present invention has been described with reference to specific exemplary embodiments, it is noted that various modifications and changes may be made to these embodiments without departing from the broad spirit and scope of the present invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the systems and methods may be embodied using transistors, logic gates, and electrical circuits (for example, application specific integrated circuit (ASIC) circuitry and/or in Digital Signal Processor (DSP) circuitry).

Particularly, the system 150 and its various components such as the processor 702, the memory 704, the I/O module 706, the communication module 708, the database 710 and the centralized circuit system 712 may be enabled using software and/or using transistors, logic gates, and electrical circuits (for example, integrated circuit circuitry such as ASIC circuitry). Various embodiments of the present invention may include one or more computer programs stored or otherwise embodied on a computer-readable medium, wherein the computer programs are configured to cause a processor or computer to perform one or more operations (for example, operations explained herein with reference to FIG. 6). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the present invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the present invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A method comprising:
providing, by a system, a notification to a customer on an electronic device associated with the customer, the notification provided in response to the customer placing a call for seeking an interaction with an agent of an enterprise, the notification configured to trigger authentication of the customer using an application on the electronic device, wherein the electronic device comprises biometric access hardware and, wherein the authentication of the customer is performed on the electronic device using the biometric access hardware;
receiving, by the system, a status of the authentication of the customer from the application on the electronic device;
if the status of the authentication of the customer is a success, connecting the call to the agent by the system to facilitate the interaction between the customer and the agent;
identifying the customer, by the system, using a device identifier of the electronic device used by the customer for placing the call;
predicting, by the system, an intention of the customer for seeking the interaction with the agent based on the customer identification; and
performing, by the system:
routing the call to the agent suitable for handling the interaction with the customer,
determining the suitability of the agent based on the predicted intention of the customer, and
providing one or more recommendations to the agent for handling the interaction with the customer based on the predicted intention of the customer.

2. The method as claimed in claim 1, further comprising:
subsequent to a customer selection of the notification, causing determination of whether the application is present on the electronic device.

3. The method as claimed in claim 2, further comprising:
providing a request to the customer to download the application on the electronic device if the application is determined to be absent in the electronic device.

4. The method as claimed in claim 2, wherein the determination of the presence of the application on the electronic device is configured to cause an invoking of the application.

5. The method as claimed in claim 4, further comprising:
subsequent to the invoking of the application, causing determination of whether the application is linked with customer authentication information stored in the electronic device for authenticating the customer.

6. The method as claimed in claim 5, further comprising:
providing a request to the customer to link the application to the customer authentication information if the application is not linked to the customer authentication information.

7. The method as claimed in claim 5, further comprising:
requesting the customer to provide an input in relation to authenticating a customer identity if the application is determined to be linked to customer authentication information; and
comparing the input with the customer authentication information stored in the electronic device, wherein the status of the authentication is determined based on a result of the comparison.

8. The method as claimed in claim 1, wherein the notification corresponds to one of a Short Message Service (SMS) notification, a Web browser notification and an Operating System (OS) notification.

9. The method as claimed in claim 1, wherein the call placed by the customer corresponds to one of a call to an interactive voice response (IVR) system, a Voice-Over Internet Protocol (VOID) call and a Web Real-Time Communication (WebRTC) call.

10. A system comprising:
a memory for storing instructions; and
a processor configured to execute the instructions and thereby cause the system to perform at least:
provide a notification to a customer on an electronic device associated with the customer, the notification provided in response to the customer placing a call for seeking an interaction with an agent of an enterprise, the notification configured to trigger authentication of the customer using an application on the electronic device, wherein the electronic device comprises biometric access hardware and, wherein the electronic device is further caused to:
request the customer to provide a biometric input in relation to authenticating a customer identity if the application is linked to customer biometric information; ands
compare the biometric input with the customer biometric information stored in the electronic device, wherein the status of the authentication is determined based on a result of the comparison; and
wherein the system is further caused to:
receive a status of the authentication of the customer from the application on the electronic device;
if the status of the authentication of the customer is a success, connect the call to the agent to facilitate the interaction between the customer and the agent;

identify the customer using a device identifier of the electronic device used by the customer for placing the call;
predict an intention of the customer for seeking the interaction with the agent based on the customer identification; and
perform:
routing the call to the agent suitable for handling the interaction with the customer,
determining the suitability of the agent based on the predicted intention of the customer, and
providing one or more recommendations to the agent for handling the interaction with the customer based on the predicted intention of the customer.

11. The system as claimed in claim 10, wherein a customer selection of the notification is configured to cause a determination of whether the application is present on the electronic device and, wherein the determination of the presence of the application on the electronic device is configured to cause an invoking of the application.

12. The system as claimed in claim 11, wherein the system is further caused to:
provide a request to the customer to download the application on the electronic device if the application is determined to be absent in the electronic device.

13. The system as claimed in claim 11, wherein subsequent to the invoking of the application, a determination of whether the application is linked with customer biometric information stored in the electronic device for authenticating the customer is caused.

14. The system as claimed in claim 13, wherein the system is further caused to:
provide a request to the customer to link the application to the customer biometric information if the application is not linked to the customer biometric information.

15. An electronic device associated with a customer, the electronic device comprising:
a biometric access hardware capable of authenticating a customer identity;
a memory for storing instructions, the memory comprising an application associated with an enterprise, the application configured to facilitate authentication of the customer using the biometric access hardware wherein the authentication of the customer is performed on the electronic device using the biometric access hardware; and
a processor configured to execute the instructions and thereby cause the electronic device to perform at least:
receive a notification from a system, the notification provided by the system in response to the customer placing a call for seeking an interaction with an agent of the enterprise;
subsequent to a customer selection of the notification, cause determination of whether the application is present on the electronic device, wherein the presence of the application on the electronic device is configured to cause an invoking of the application;
cause determination of whether the application is linked to customer biometric information stored in the electronic device for authenticating the customer subsequent to the invoking of the application;
if the application is linked to customer biometric information, request the customer to provide a biometric input using the biometric access hardware, the biometric input requested in relation to authenticating the customer identity;
compare the biometric input with the customer biometric information stored in the electronic device, wherein a status of the authentication is determined based on a result of the comparison;
provide the status of the authentication of the customer to the system, wherein the call is connected to the agent by the system to facilitate interaction between the customer and the agent if the status of the authentication of the customer is a success;
identify the customer using a device identifier of the electronic device used by the customer for placing the call;
predict an intention of the customer for seeking the interaction with the agent based on the customer identification; and
perform:
routing the call to the agent suitable for handling the interaction with the customer,
determining the suitability of the agent determined based on the predicted intention of the customer, and
providing one or more recommendations to the agent for handling the interaction with the customer based on the predicted intention of the customer.

16. The electronic device as claimed in claim 15, wherein the electronic device is further caused to perform at least one of:
provide a request to the customer to download the application on the electronic device if the application is determined to be absent in the electronic device; and
provide a request to the customer to link the application to the customer biometric information if the application is not linked to the customer biometric information.

* * * * *